(12) United States Patent
Zuo

(10) Patent No.: US 9,908,579 B2
(45) Date of Patent: Mar. 6, 2018

(54) INTELLIGENT SOMATIC FULL-BALANCE ELECTRIC VEHICLE

(71) Applicant: Changzhou Airwheel Technology Co., LTD, Changzhou (CN)

(72) Inventor: Guogang Zuo, Changzhou (CN)

(73) Assignee: CHANGZHOU AIRWHEEL TECHNOLOGY CO., LTD., Changzhou, Jiangsu (CN)

( * ) Notice: Subject to any disclaimer, the term of this patent is extended or adjusted under 35 U.S.C. 154(b) by 2 days.

(21) Appl. No.: 14/908,616

(22) PCT Filed: Nov. 21, 2014

(86) PCT No.: PCT/CN2014/091841
§ 371 (c)(1),
(2) Date: Jan. 29, 2016

(87) PCT Pub. No.: WO2015/085853
PCT Pub. Date: Jun. 18, 2015

(65) Prior Publication Data
US 2016/0185412 A1    Jun. 30, 2016

(30) Foreign Application Priority Data
Dec. 12, 2013 (CN) .......................... 2013 1 0673317

(51) Int. Cl.
*B62K 3/00* (2006.01)
*B60L 3/12* (2006.01)
(Continued)

(52) U.S. Cl.
CPC ............. *B62K 3/007* (2013.01); *B60L 3/12* (2013.01); *B60L 15/20* (2013.01); *B62J 25/00* (2013.01);
(Continued)

(58) Field of Classification Search
CPC .. B62K 11/007; B62K 3/007; B62K 2204/00; B60L 3/12
See application file for complete search history.

(56) References Cited

U.S. PATENT DOCUMENTS 6,302,230 B1 *   10/2001   Kamen .................. A63C 17/01
                                                              180/171
2005/0121866 A1 *  6/2005   Kamen .................. A63C 17/01
                                                              280/47.18
(Continued)

FOREIGN PATENT DOCUMENTS

CN     102717854 A    10/2012
CN     103057635 A    4/2013
(Continued)

*Primary Examiner* — Tony H Winner
*Assistant Examiner* — Gabriela C Craciun
(74) *Attorney, Agent, or Firm* — Troutman Sanders LLP

(57) ABSTRACT

An intelligent somatic full-balance electric vehicle comprises two wheels (11, 12) of a same size and a motor (4) disposed between the two wheels (11, 12), the two wheels (11, 12) being coaxially connected to the motor (4) through an axle (3); the intelligent somatic full-balance electric vehicle further comprises a control system (10) and a power supply (9); both the control system (10) and the power supply (9) are disposed inside a housing of the vehicle body and located above the wheels, or between the two wheels (11, 12); or one of the control system (10) and the power supply (9) is located between the two wheels (11, 12), and the other is located above the wheels; vertical columns (6) are separately disposed at two ends of the axle (3), and the vertical columns (6) are separately provided with pedals (5) on external sides of the wheels. Because the two coaxial wheels (11, 12) are used, the electric vehicle can implement full balance like a bicycle, and in addition, has unique advantages of a monocycle, namely, having a small size and being easy to carry.

20 Claims, 2 Drawing Sheets

(51) Int. Cl.
*B60L 15/20* (2006.01)
*B62J 25/00* (2006.01)
*B62M 7/12* (2006.01)
*B62K 11/00* (2006.01)

(52) U.S. Cl.
CPC ............ *B62K 11/007* (2016.11); *B62M 7/12* (2013.01); *B62K 2204/00* (2013.01); *Y02T 10/7258* (2013.01)

(56) References Cited

U.S. PATENT DOCUMENTS

| | | | | |
|---|---|---|---|---|
| 2011/0067939 A1* | 3/2011 | Takenaka | ............ | B62K 11/007 180/21 |
| 2011/0220427 A1* | 9/2011 | Chen | ............ | B62K 1/00 180/21 |
| 2011/0303475 A1* | 12/2011 | Kim | ............ | B62K 11/007 180/218 |
| 2012/0175175 A1* | 7/2012 | Gomi | ............ | B62J 1/005 180/21 |
| 2014/0067178 A1* | 3/2014 | Taira | ............ | B62K 3/007 701/22 |
| 2015/0075881 A1* | 3/2015 | Liu | ............ | B62K 1/00 180/21 |
| 2015/0127246 A1* | 5/2015 | Guo | ............ | B62K 11/007 701/124 |
| 2016/0129957 A1* | 5/2016 | Murakami | ............ | G05D 1/02 701/70 |
| 2016/0303900 A1* | 10/2016 | Yoshino | ............ | B60B 19/003 |
| 2016/0325801 A1* | 11/2016 | Artemev | ............ | B62K 11/007 |

FOREIGN PATENT DOCUMENTS

| | | | | |
|---|---|---|---|---|
| CN | 203318594 | * | 12/2013 | ............ B62K 11/00 |
| CN | 203318594 U | | 12/2013 | |
| CN | 103612696 A | | 3/2014 | |
| CN | 203638016 U | | 6/2014 | |

* cited by examiner

INTELLIGENT SOMATIC FULL-BALANCE ELECTRIC VEHICLE

The present application is the U.S. National Phase of International Patent Application Serial No. PCT/CN2014/091841, filed Nov. 21, 2014, which claims priority to Chinese Patent Application Serial No. 201310673317.7, filed Dec. 12, 2013. The contents of the foregoing applications are hereby incorporated by reference in their entireties.

TECHNICAL FIELD

The present invention discloses an intelligent somatosensory full-balanced electric vehicle, which belongs to the technical field of somatosensory balanced electric vehicles.

BACKGROUND ART

With the continuous economic development in today's society, the number of transportation means has been increasing; faced with the increasingly congested city roads, the contradictions between the pavement resources and the number of automobiles are becoming increasingly acute, and only adapting the transportation means to our roads can be the way out. While a series of environmental problems such as global warming, ozone hole, rising sea levels are plaguing us, for which automobile exhaust emission is one of the significant causes. Therefore, we need a transportation means which is energy-saving, environmental-friendly and singly filed in the crowds to solve these increasingly acute contradictions.

At present, an intelligent somatosensory balance electric vehicle, also known as segway, generally uses lithium batteries as power supplies. It is environmentally-protective and energy-saving, and perhaps will be our next generation of transportation means. It is constructed as either a single-wheel type or a two-wheel type, and its operating principle is based on a "dynamic stability", i.e., the vehicle body balance in the running direction is maintained by the automatic balancing ability of the electric vehicle itself; a gyroscope i.e., a somatosensory balanced system is generally provided inside the vehicle body, and the real-time condition of the vehicle body is sensed via the somatosensory balanced system to transmit information to the information processing system; after the sensed information is processed by the information processing system, appropriate instructions are computed and delivered to the electrical control system, and a balance state for the vehicle body running is achieved by controlling the brake motor; thus the acceleration and deceleration of the vehicle body can be directly controlled by the driver by virtue of displacement of the center of gravity to realize a running balance.

With the increasingly congested traffic, the intelligent somatosensory balance electric vehicle is undoubtedly the most convenient transportation means in the downtown, no matter whether it is a single-wheel intelligent somatosensory balance electric vehicle or a two-wheel intelligent somatosensory balance electric vehicle, both of which take up a small space; however, although there is a self-balanced system for the single-wheel intelligent somatosensory balance electric vehicle in the running direction, it cannot realize balance adjustment of the vehicle body in the left-right direction to achieve a full-balanced as the two-wheel intelligent somatosensory balance electric vehicle does, because it has only one fulcrum on the ground. Although the two-wheel intelligent somatosensory balance electric vehicle will not only be self-balanced in the running direction, at the same time but also keep balance in the left-right direction because its two wheels support the vehicle body, it cannot be carried around in a non-running state like the single-wheel intelligent somatosensory balance electric vehicle, because of its larger size and weight.

SUMMARY OF THE INVENTION

The main technical problem to be solved by the present invention is to provide an electric vehicle, taking into account advantages of the single-wheel electric vehicles such as small size, light weight and portability and advantages of the two-wheel electric vehicles such as achieving full-balanced for easy riding.

To solve the above technical problem, the present invention provides an intelligent somatosensory full-balanced electric vehicle, comprising two wheels of the same size and a motor arranged between the two wheels, wherein the two wheels are coaxially connected to the motor via an axle; the intelligent somatosensory full-balanced electric vehicle further comprises a control system and a power supply, both of which arranged inside a body housing and located above the wheels, or located between the two wheels, or one of the control system and the power supply is located between the two wheels and the other one is located above the wheels; each end of the axle is provided with a post which is provided with a foot rest located at an outer side of the wheel.

As a preferred solution, a distance between tire centers of the two wheels is 3 cm to 12 cm, more preferably 5 cm to 10 cm, and a distance between the outer sides of the two wheels is less than or equal to 35 cm. As one of the preferences, the center of gravity of the two wheels and the motor coincides with the geometrical center.

As one preferred solution, the center of gravity of the control system and the power supply is located at a plumb line passing by a center of gravity of a combination of the two wheels and the motor. Wherein, the motor is an in-wheel motor. Three Hall sensors are equidistantly arranged on a coil of the in-wheel motor with an interval of 120 degrees.

In order to improve the performance of human-machine interaction, a vehicle condition information display device is further arranged on the body housing. The vehicle condition information display system comprises an electric quantity information indicator of a power supply and/or an alarm system before power exhaustion; an information indicator of a running distance or a remaining distance to be run; and a running speed indicator.

Being similar to an electric monocycle in the prior art, the control system includes a somatosensory balanced system, an electrical control system and an information processing system.

For the purpose of portability, the foot rest can be switched between an operating position and a storage position, and when the foot rest is at the storage position, a magnet arranged in the foot rest can oppositely attract a magnet in the body housing for fixing the foot rest. To be adaptive to different operational environments, a mounting position of the foot rest on the post can be adjusted up and down.

Since the intelligent somatosensory full-balanced electric vehicle of the present invention adopts the two coaxial wheels, it can achieve a full-balanced just like a two-wheeled vehicle, and also has the advantages of small size and portability of a monocycle.

BRIEF DESCRIPTION OF THE DRAWINGS

The accompanying drawings in the present invention are provided for the purpose of further illustration of the present invention, rather than limiting the scope of the present invention.

ILLUSTRATION OF THE REFERENCE NUMERALS

11—first wheel, 12—second wheel, 13—axle, 4—motor, 5—foot rest, 6—upright post, 7—magnet buckle, 8—body housing, 9—power supply, 10—control system, 13—portable handle, 14—charging interface, 15—Hall sensor, 21—power supply control switch, 22—vehicle condition information display system, and 61—through hole.

DETAILED DESCRIPTION OF THE EMBODIMENTS

Embodiments of the present invention are used for further explaining and illustrating the present invention, rather than limiting the inventive scope of the present invention.

Figure 1:
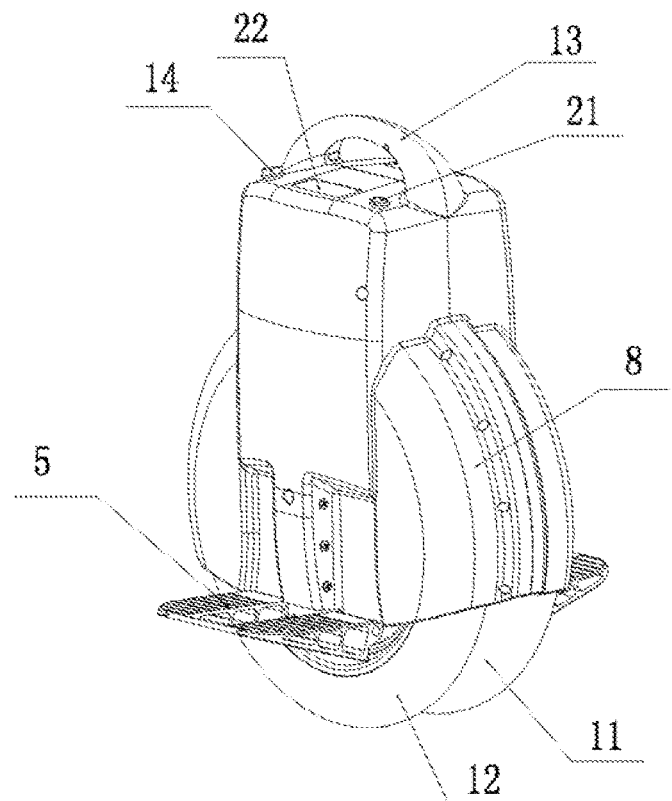
FIG. 1 is a three-dimensional schematic diagram of an overall vehicle of an intelligent somatosensory full-balanced electric vehicle in the present invention.
Figure 2:
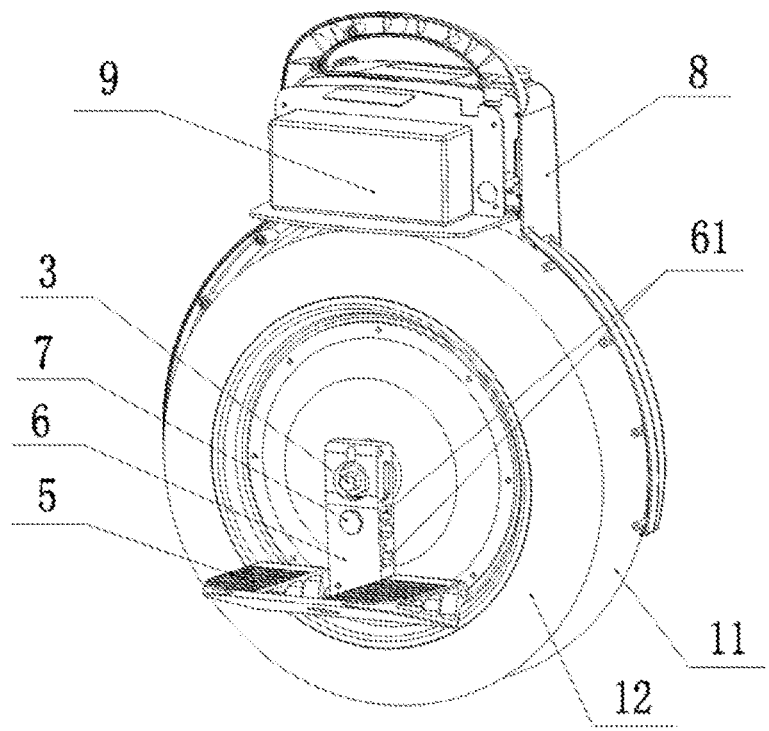
FIG. 2 is a structural schematic diagram of an interior of the intelligent somatosensory full-balanced electric vehicle as shown in FIG. 1 with a body housing removed on one side.
Figure 3:
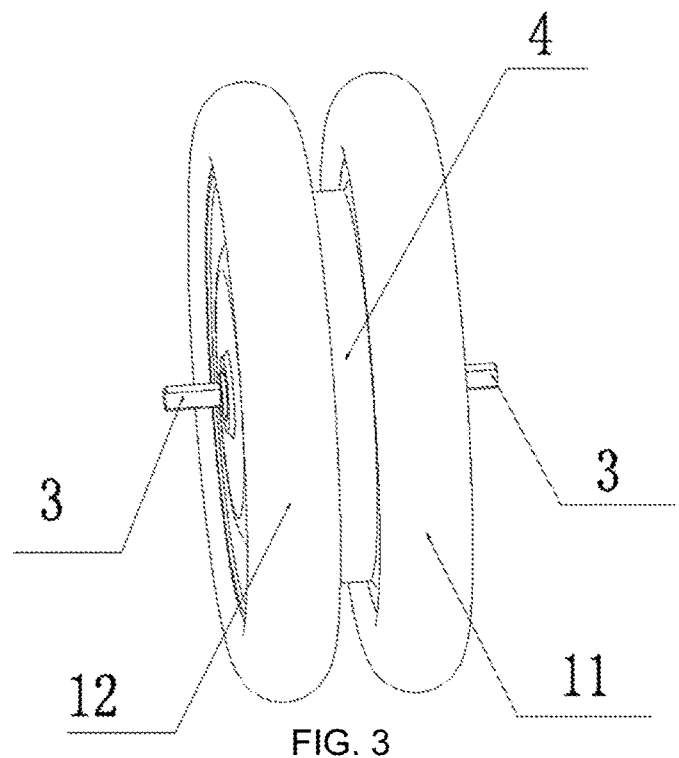
FIG. 3 is a three-dimensional structural schematic diagram of a connection between two wheels and a motor of the intelligent somatosensory full-balanced electric vehicle in the present invention as shown in FIG. 1.
Figure 4:
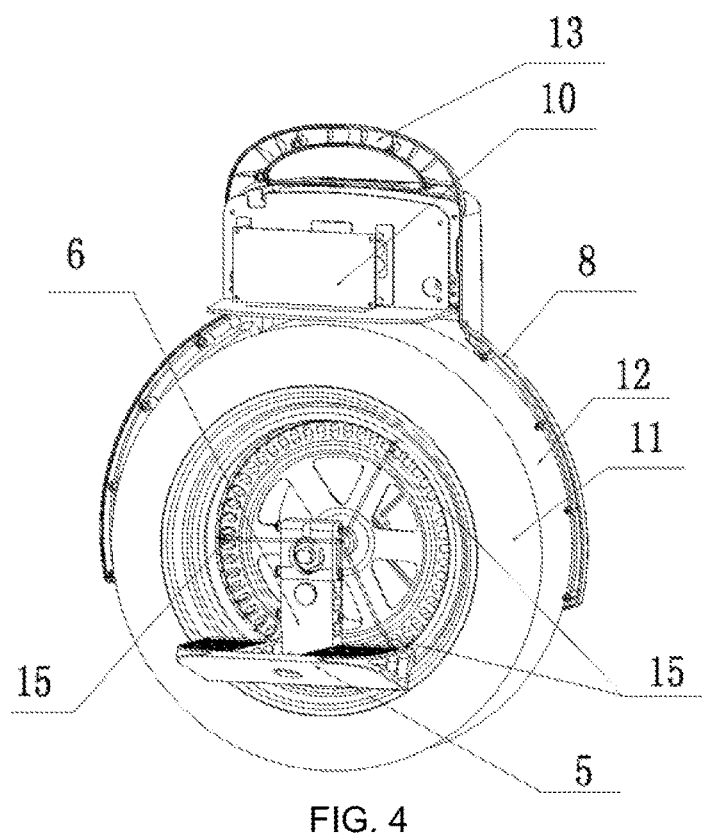
FIG. 4 is a cross-sectional schematic diagram of the motor of the intelligent somatosensory full-balanced electric vehicle as shown in FIG. 1.

FIG. 1 is a three-dimensional schematic diagram of an overall vehicle of an intelligent somatosensory full-balanced electric vehicle in the present invention. FIG. 2 is a structural schematic diagram of an interior of the intelligent somatosensory full-balanced electric vehicle as shown in FIG. 1 with a body housing removed on one side. FIG. 3 is a three-dimensional structural schematic diagram of a connection between two wheels and a motor of the intelligent somatosensory full-balanced electric vehicle in the present invention as shown in FIG. 1. FIG. 4 is a cross-sectional schematic diagram of the motor of the intelligent somatosensory full-balanced electric vehicle as shown in FIG. 1.

As shown in FIGS. 1 to 3, the intelligent somatosensory full-balanced electric vehicle according to the embodiment comprises two wheels which are identical, namely, a first wheel 11 and a second wheel 12, respectively; and a distance between the tire centers of the first wheel 11 and the second wheel 12 is 8 cm. A motor 4 is disposed between the first wheel 11 and the second wheel 12; and the first wheel 11, the second wheel 12 and the motor 4 are coaxially connected with one another through an axle 3. The motor 4 is centrosymmetric; the first wheel 11 and the second wheel 12 are symmetrically mounted at two ends of the axle 3, so that the first wheel 11, the second wheel 12 and the motor 4 are combined into a centro-symmetric structure having its gravity center folded with the geometric center. On one hand, the motor 4 serves as a power supply to drive the axle 3 to rotate along with the first wheel 11 and the second wheel 12; on the other hand, when braking is required, the motor 4 also acts as a brake in such a manner that when slight braking is required, the control system sends a signal to reduce and even cut off the power supply to the motor 4, so that a driving force of the motor 4 decreases or disappears, and a braking resistance is provided by the friction of the wheels on the ground, while when emergency hard braking is required, the control system sends a signal to invert electrodes of the motor 4, so that the motor 4 provides power opposite to the driving force, namely a resistance, to achieve the braking; therefore, the motor 4 is also called as a brake motor.

As shown in the FIG. 3, the intelligent somatosensory full-balanced electric vehicle according to the embodiment is a structure in which a motor 4 is disposed between the first wheel 11 and the second wheel 12; through experimental researches, the inventor of the invention discovers that the distance between the tire centers of the two wheels would better range from 3 cm to 12 cm, and preferably from 5 cm to 10 cm. In this way, plus the width of tires, a distance between the outer sides of the tires on the two wheels is less than or equal to 35 cm. Since legs of a user need to bestride the vehicle body, a too large width of the vehicle body will make it difficult for the user to ride. Since the small distance between the two wheels results in the small width, as shown in the FIG. 1, the intelligent somatosensory full-balanced electric vehicle according to the embodiment has a structure similar to that of a monocycle, while differs from that of a common two-wheeled vehicle. In two-wheeled vehicles in the prior art, typically the two-wheeled vehicle branded Segway, a foot rest allowing the user to stand thereon is disposed between the two wheels.

One advantage of the structure in which the motor 4 is disposed between the first wheel 11 and the second wheel 12 is that the interior space of the motor 4 is available for effective use. Compared with the monocycle in the prior art having a single wheel, the intelligent somatosensory full-balanced electric vehicle features that the width of a rotor of the motor 4 is equivalent to and slightly greater than the width of the two wheels, while the width of a stator of the motor 4 is substantially equal to that of the stator of the motor of the monocycle in the prior art having the single wheel; therefore, the space between the rotor and stator of the motor 4 in the present invention is larger and allows required devices, such as a control circuit board, to be mounted, and even if no device is mounted, the heat dispersion of the motor can be enhanced. In addition, since the motor generates heat in the operating process, a gap is provided between the first wheel 11 and the second wheel 12 for convenient heat dispersion of the motor 4 and improving the heat dispersion efficiency. Thus, the motor needs a timely heat dispersion during the operating process so as to improve its operational performance.

As shown in FIG. 2, an upright post 6 is fixed on both ends of the axle 3, respectively; a foot rest 5 for enabling a rider to stand is fixed on the upright post 6; and the position of the foot rest 5 on the upright post 6 can be adjusted up and down according to the body height of the rider, or road conditions, or operation and control demands, so that the position of the foot rest 5 on the upright post 6 can be adjusted up and down and fixed. Meanwhile, the foot rest 5 is set with an operating position and a storage position at a non-operating state; the foot rest 5 can be freely switched between the operating position and the storage position according to the demands of the rider; a magnet (not shown in the figure) is fixed in the foot rest 5; a magnet buckle 7 is arranged on the upright post 6; and when the foot rest 5 is at the storage position, the magnet buckle 7 and the magnet in the foot rest 5 attract each other to fix the foot rest 5. The position of the foot rest 5 on the upright post 6 is adjusted in this way: please see FIG. 2, a plurality of through holes 61 having different heights and used for connecting the foot rest 5 are arranged on the upright post 6, and according to demands, a user can select different through holes 61 to mount the foot rest 5, so as to adjust the height of the foot rest 5.

A continuous illustration of the structure of the intelligent somatosensory full-balanced electric vehicle in the present invention will be given below in combination with FIG. 1 to FIG. 3. A body housing 8 is fixed on the upright post 6, a control system 10 and a power supply 9 (which can be a lithium battery or other rechargeable batteries) are arranged inside the body housing 8 above the two wheels; moreover, the control system 10 and the power supply 9 are arranged at left and right, and a center of gravity of a combination of the control system 10 and the power supply 9 is located on a plumb line passing by a center of gravity of a combination of the first wheel 11, the second wheel 12 and the motor 4, so as to improve the center of gravity of the overall vehicle and achieve better maneuverability of the intelligent somatosensory full-balanced electric vehicle in the present invention. That is, the first wheel 11, the second wheel 12 and the motor 4 are combined into a centro-symmetric structure, the center of gravity thereof is located at the geometrical center, and a plumb line passing by the center of gravity thereof also passes by the center of gravity of the combination of the control system 10 and the power supply 9. Compared with the structure of the monocycle in the prior art that the power supply and the control system are arranged in the internal space of the motor 4, in the present invention, the control system 10 and the power supply 9 are located above the wheels to save the internal space of the motor 4, and the heat dispersion performance thereof is also improved from another aspect. Of course, since a gap exists between the first wheel 11 and the second wheel 12, the control system 10 and the power supply 9 can also be arranged in the gap to decrease the size of the overall vehicle. In this case, the center of gravity of the control system 10 or the power supply 9 still shall be arranged on the plumb line passing by the center of gravity of the combination of the first wheel 11, the second wheel 12 and the motor 4. Those skilled in the art can understand that, because of different sizes of the gap between the first wheel 11 and the second wheel 12, if the gap therebetween is large enough, the control system 10 and the power supply 9 can be simultaneously arranged therebetween. Otherwise, one of the control system 10 and the power supply 9 is arranged between the first wheel 11 and the second wheel 12, and the other one is arranged above the first wheel 11 and the second wheel 12, and all these are feasible arrangement solutions.

The intelligent somatosensory full-balanced electric vehicle of the present invention has the advantages of both a monocycle and a two-wheeled vehicle in the prior art. Being provided with two wheels, the intelligent somatosensory full-balanced electric vehicle can keep balance in the left-right direction. Since the two wheels are close to each other, and foot rests are arranged at the outer sides of the wheels, the intelligent somatosensory full-balanced electric vehicle is similar to the monocycle in structure and has advantages of small size and light weight. More importantly, compared with the existing intelligent somatosensory balance electric vehicle, the intelligent somatosensory full-balanced electric vehicle is more energy-saving, and improves the maneuverability and stability. Compared with the monocycle intelligent somatosensory balance vehicle in the prior art, the size and external configuration are slightly changed. However, the intelligent somatosensory full-balanced electric vehicle of the present invention consists of two wheels which form two fulcrums with the ground, and the two fulcrums form a stable three-point balance with a balance point in the running direction of the vehicle body, so that the electric vehicle of the present invention stays at a full-balanced state. Being different from a dual-wheel intelligent somatosensory balance vehicle of the prior art, the intelligent somatosensory full-balanced electric vehicle of the present invention is provided with only one motor coaxially connected with the two wheels, so that single-motor dual-wheel driving and dual-wheel braking can be realized.

By means of countless experimental researches, the inventor of the present invention discovers that when two wheels of the intelligent somatosensory full-balanced electric vehicle of the present invention are coaxially connected with the motor and a geometric center thereof is overlapped with the center of gravity, the performances of control, stability and energy-saving are optimal.

By means of experiments, the inventor of the present invention discovers that the maneuverability of the intelligent somatosensory electric vehicle of the present invention can be better by raising the center of gravity of the overall vehicle. A control system 10 and a power supply 9 are arranged inside a body housing 8 above the two wheels by the inventor of the present invention, so that the maneuverability of the intelligent somatosensory full-balanced electric vehicle can be improved.

The principle is that when a rider controls the acceleration or deceleration, the arm of force is increased due to the rising of the center of gravity, and the control force needed by the rider is decreased. The control speed for the rider to change the running state of the vehicle body is also decreased at the same time. Compared with a solution that the control system and the power supply are separately arranged at two sides of the wheels, the present invention is more energy-saving, and the principle thereof is that the time for balance compensation after the vehicle body is sensed as losing balance can be shortened relatively by the intelligent somatosensory electric vehicle of the present invention, so that the electric energy loss is directly saved.

The body housing 8 comprises a portable handle 13 to facilitate a carriage. The body housing 8 is further provided with a charging interface 14, a power supply control switch 21 and a vehicle condition information display system 22; after the power supply switch 21 is turned on, the vehicle condition information display system 22 can display the vehicle body condition immediately, and can comprise electric quantity information and/or an alarm system before power exhaustion, and can further comprise an information indicator for a running distance or a remaining distance to be run for the electric vehicle; the vehicle condition information display system 22 can further comprise a running speed indicator. All information can be displayed by the LED. In addition, the body housing 8 can be further provided with an LED lamp for decoration, or illumination or indication during night riding.

As shown in FIG. 4, as a preference, in the present embodiment, the motor 4 is an in-wheel motor. To enable the signal acquisition to be more accurate, three Hall sensors 15 on a coil of the in-wheel motor are equidistantly arranged, and the angle between every two adjacent Hall sensors 15 is 120 degrees, so that the control system can more accurately acquire each signal. The Hall sensors 15 are used for acquiring rotation speed signals of the wheels. The acquired rotation speed signals are more accurate when the three Hall sensors are further apart from one another along the periphery of the coil, thus the three Hall sensors 15 are uniformly arranged, which is similar to the prior art and not repeated.

In the intelligent somatosensory full-balanced electric vehicle of the present invention, the control system includes a somatosensory balanced system, an electrical control system, an information processing system, etc., wherein, the somatosensory balanced system, the electrical control system and the information processing system are the same as those in a monocycle or a two-wheeled vehicle in the prior art, thus their operating processes are not repeated. However, the control system of the two-wheeled intelligent somatosensory full-balanced electric vehicle does not need a two-wheeled differential speed control system.

The term "full-balanced" in the present invention means not only to achieve a dynamic balance in the forward direction of the electric vehicle, but also to achieve dynamic and static balances in a direction perpendicular to the forward direction.

Of course, the above descriptions are preferred embodiments of the present invention. It should be noted that those skilled in the art can make some improvements and modifications without deviating from the principle of the present invention, and those improvements and modifications are also deemed as falling within the protection scope of the present invention.

The invention claimed is:

1. An intelligent somatosensory full-balanced electric vehicle, characterized by comprising two wheels of the same size and one motor arranged between the two wheels, wherein the two wheels are coaxially connected to the motor via an axle;
the intelligent somatosensory full-balanced electric vehicle further comprises a control system and a power supply, both of which are arranged inside a body housing and located above the wheels, or located between the two wheels, or one of the control system and the power supply is located between the two wheels and the other one is located above the wheels;
each end of the axle is provided with a post which is provided with a foot rest located at an outer side of each of the two wheels.

2. The intelligent somatosensory full-balanced electric vehicle according to claim 1, characterized in that a distance between tire centers of the two wheels is 3 cm to 12 cm, and a distance between the outer sides of the two wheels is less than or equal to 35 cm.

3. The intelligent somatosensory full-balanced electric vehicle according to claim 1, characterized in that the center of gravity of the two wheels and the motor coincides with the geometric center.

4. The intelligent somatosensory full-balanced electric vehicle according to claim 3, characterized in that the center of gravity of the control system and the power supply is aligned with the center of gravity of a combination of the two wheels and the motor in a line directed to a center of gravity of Earth.

5. The intelligent somatosensory full-balanced electric vehicle according to claim 1, characterized in that the motor is an in-wheel motor.

6. The intelligent somatosensory full-balanced electric vehicle according to claim 5, characterized in that three Hall sensors are equidistantly arranged on a coil of the in-wheel motor with an interval of 120 degrees.

7. The intelligent somatosensory full-balanced electric vehicle according to claim 2, characterized in that the distance between the tire centers of the two wheels is 5 cm to 10 cm.

8. The intelligent somatosensory full-balanced electric vehicle according to claim 1, characterized in that a vehicle condition information display system is further arranged on the body housing.

9. The intelligent somatosensory full-balanced electric vehicle according to claim 8, characterized in that the vehicle condition information display system comprises an electric quantity information indicator of the power supply and/or an alarm system before power exhaustion.

10. The intelligent somatosensory full-balanced electric vehicle according to claim 8, characterized in that the vehicle condition information display system comprises an information indicator of a running distance or a remaining distance to be run.

11. The intelligent somatosensory full-balanced electric vehicle according to claim 8, characterized in that the vehicle condition information display system comprises a running speed indicator.

12. The intelligent somatosensory full-balanced electric vehicle according to claim 1, characterized in that the control system comprises a somatosensory balanced system, an electrical control system and an information processing system.

13. The intelligent somatosensory full-balanced electric vehicle according to claim 1, characterized in that the foot rest can be switched between an operating position and a storage position.

14. The intelligent somatosensory full-balanced electric vehicle according to claim 13, characterized in that when the foot rest is at the storage position, a magnet arranged in the foot rest oppositely attracts another magnet in the body housing for fixing the foot rest.

15. The intelligent somatosensory full-balanced electric vehicle according to claim 1, characterized in that a mounting position of the foot rest on the post can be adjusted up and down.

16. An intelligent electric vehicle, comprising:
one motor having a center axle;
two wheels mounting on the motor and rotating round the axle of the motor, wherein the motor is disposed between the two wheels;
a body housing covering at least a topper of the two wheels;
a control device arranged inside the body housing for receiving and transmitting signals between rider and the motor;
a power supply arranged inside the body housing for supplying power to the motor;
wherein, both of the control device and the power supply located above the wheels, or located between the two wheels, or one of the control system and the power supply is located between the two wheels and the other one is located above the wheels;
each end of the center axle is provided with a post which is provided with a foot rest located at an outer side of each of the two wheels.

17. An intelligent somatosensory full-balanced electric vehicle, characterized by comprising two wheels parallel connected to one motor, wherein the motor joins wheel rims of the two wheels and has a center axle;
the intelligent somatosensory full-balanced electric vehicle further comprises a control system and a power supply, both of which are arranged inside a body housing and located above the wheels, or located between the two wheels, or one of the control system and the power supply is located between the two wheels and the other one is located above the wheels;

each end of the axle is provided with a post which is provided with a foot rest located at an outer side of each of the two wheels.

18. The intelligent somatosensory full-balanced electric vehicle according to claim 17, characterized in that a distance between tire centers of the two wheels is 3 cm to 12 cm, and a distance between the outer sides of the two wheels is less than or equal to 35 cm.

19. The intelligent somatosensory full-balanced electric vehicle according to claim 17, characterized in that the center of gravity of the two wheels and the motor coincides with the geometric center.

20. The intelligent somatosensory full-balanced electric vehicle according to claim 17, characterized in that the center of gravity of the control system and the power supply is aligned with the center of gravity of a combination of the two wheels and the motor in a line directed to a center of gravity of Earth.

* * * * *